Aug. 19, 1930.   R. S. SCOTT   1,773,280
AIRCRAFT
Filed Sept. 12, 1928   2 Sheets-Sheet 1
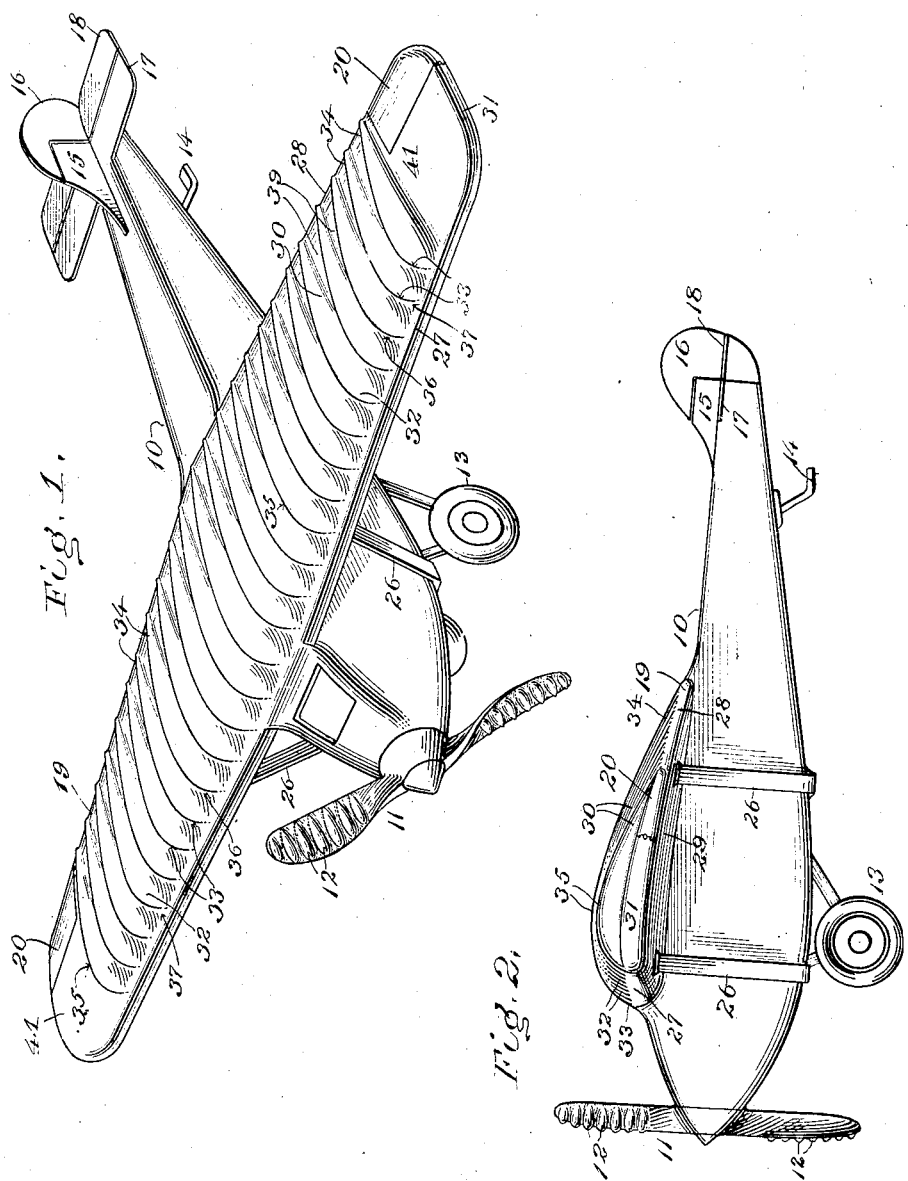
INVENTOR
Rossiter S. Scott,
BY Morrison, Kennedy + Campbell,
ATTORNEYS.

Aug. 19, 1930.    R. S. SCOTT    1,773,280
AIRCRAFT
Filed Sept. 12, 1928    2 Sheets-Sheet 2
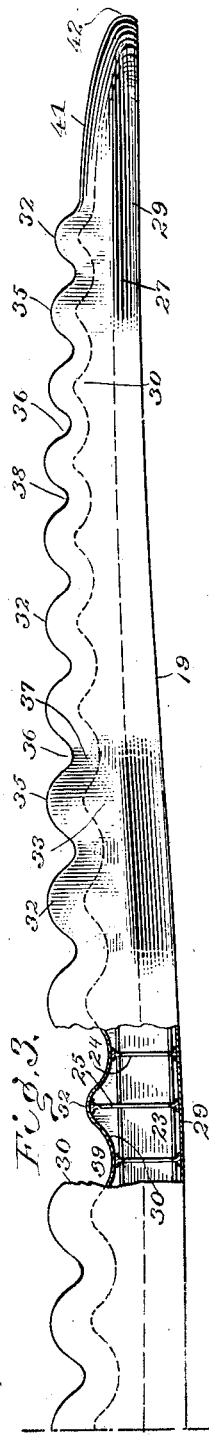
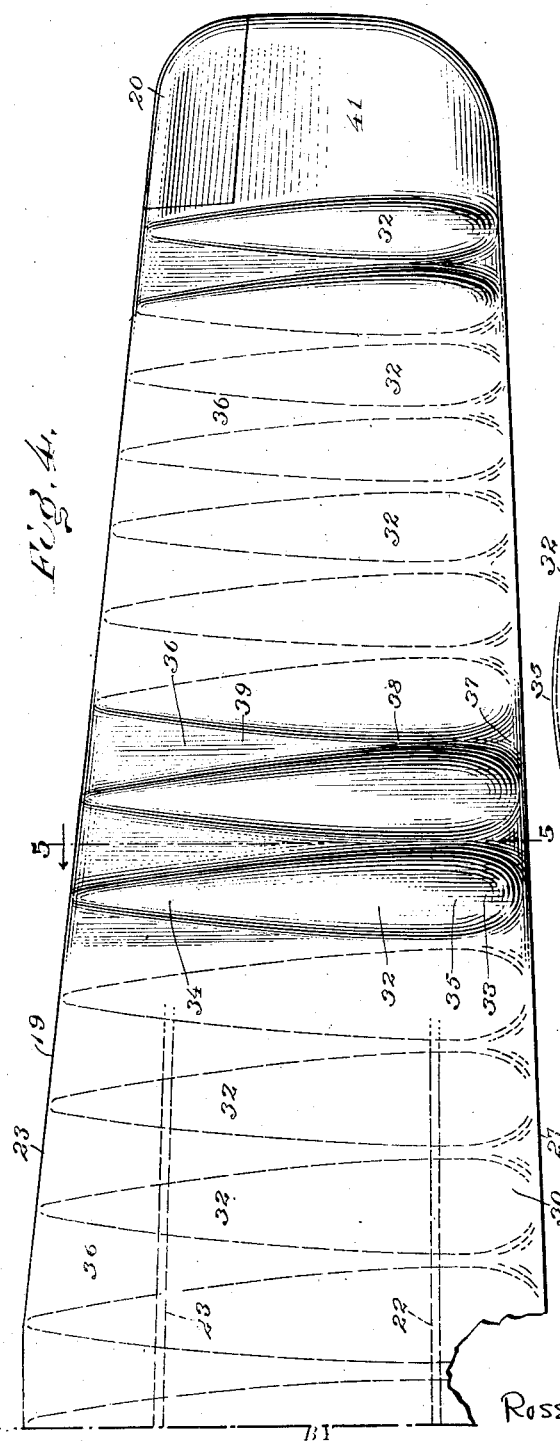
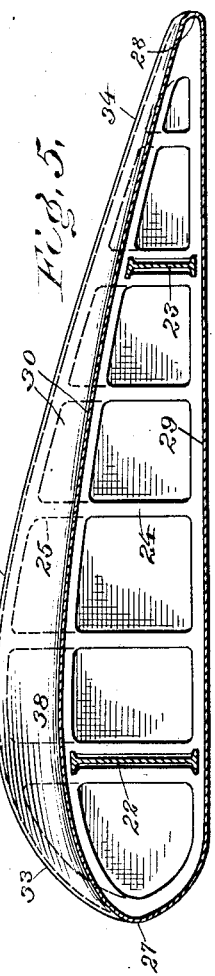
INVENTOR
Rossiter S. Scott,
Morrison, Kennedy & Campbell
ATTORNEYS.

Patented Aug. 19, 1930

1,773,280

UNITED STATES PATENT OFFICE

ROSSITER S. SCOTT, OF NEW YORK, N.

AIRCRAFT

Application filed September 12, 1928. Serial No. 305,359.

This invention relates to aircraft; and the features of novelty pertain more particularly to an aerofoil or surface designed to be projected through the air in order to produce a useful dynamic reaction. The invention therefore is not restricted in utility to the lifting surfaces or wings, or other sustaining members of aeroplanes, or other heavier-than-air flying machines, but may be employed with aerofoils used in any type of aircraft, for example used for supplementary lifting purposes in lighter-than-air craft, or even in the construction of revoluble elements, propellers, lifters and the like.

A general object of the present invention is to afford an improved kind of aerofoil, especially for the purpose of improving the efficiency and reliability in flight of aircraft, and in the case of heavier-than-air craft it is a further general object to increase their aerodynamic safety; these objects being herein attained by a principle of aerofoil construction affording improved lifting power, propulsion, stability and control, without sacrifice from increase of drag or resistance to travel through air. A further general object is to afford improved maneuverability and directional stability of aeroplanes or other aircraft.

Other and further objects and advantages of the present invention will be elucidated in the hereinafter following description of an illustrative embodiment thereof, or will be understood to those skilled in the subject. To the attainment of such objects and advantages the present invention consists in the novel aircraft, aeroplane or aerofoil herein illustrated or described, and the novel features of operation, arrangement, construction and design thereof.

In the accompanying drawings Fig. 1 is a general perspective view of a heavier-than-air craft of the monoplane type, in flight, embodying the present invention, with many matters omitted which are unnecessary to an understanding of the invention.

Fig. 2 is a side elevation of the aeroplane of Fig. 1.

Fig. 3 is a front view of one half of the aerofoil or wing of Figs. 1 and 2 viewed in a direction substantially parallel to the underneath surface of the wing, the drawing partly broken away in vertical section substantially at the line of the rear wing spar.

Fig. 4 is a top plan view of the aerofoil or wing of Fig. 3. Fig. 4ª is similar, showing a modification.

Fig. 5, on a larger scale, is a fore-and-aft section view taken substantially on the line 5—5 of Fig. 4.

The same reference numbers refer to corresponding parts in the several figures of the drawings.

The aircraft embodying this invention may have any usual form of body such as the aeroplane fuselage 10. This is of suitable streamline form, as are substantially all other major air-resisting parts of the craft, and may contain space to accommodate the engine, the operator's quarters, the controls, etc. For purposes of illustration a monoplane has been selected and this is shown as driven by a screw propeller 11 of the tractor type. The front or suction side of each propeller blade is shown as having a surface formation 12 analogous to that at the upper side of the wing, as later to be described, to improve its dynamic reaction and drive. The propeller blade may be considered as a wing or aerofoil of this invention, warped and arranged to produce propelling rather than lifting effect.

Other aeroplane elements are to be assumed, including landing gear 13, tail skid 14, fin 15 and rudder 16, stabilizer 17 and elevator 18, as well as the controls and other details not herein illustrated but understood to those conversant with the subject.

The present invention applies more particularly to the structure and form of aerofoils, for example of the wings, or the double wing 19, of the illustrated monoplane, or of the surfaces of warped wings, fixed or revolving, or of screw propellers or other aerofoil members. In general the present invention is applicable to any type of aerofoil or wing, whether fixed, movable or revolving, or any arrangement thereof, for example in a multiplane or monoplane, as well as wings having any type of plan form of which that shown in Fig. 4 is merely illustrative. Each half wing or side of the aerofoil 19 is shown as provided with the usual hinged ailerons 20 for controlling the lateral movement or roll of the craft.

The wing or aerofoil 19 may be cambered both above and below, and built up and braced by any suitable structure, consisting, for example, of internal bracing of metal with a covering or sheeting also of metal, such as an aluminum alloy. Thus, as best seen in Figs. 3 and 5, each wing is shown as comprising transverse spars, the main spar 22 being preferably a metal I-beam of suitable depth and the full transverse length of the wing, while the rear spar 23 is preferably similar but of smaller dimension as it is under less wind pressure strain.

By these spars 22 and 23 and a system of fore-and-aft frames or cambered ribs a skeleton bracing system of the cantilever type is built up, the fore-and-aft or longitudinal ribs comprising low ribs 24 and higher ribs 25, preferably stamped out of light metal, of open structure, and with apertures permitting them to be threaded and secured to the main and rear spars, as indicated. Exterior of the wings are shown diagonal braces 26 extending between the bracing system of the wings and the lower side of the fuselage or car 10.

The aerofoil covering may be of thin metal or other suitable sheeting material. At the under side of the wing and extending from the leading edge or nose 27 to the trailing edge 28 is the under covering 29, which may be substantially flat or slightly cambered upwardly, and with its fore-and-aft edges rounded to the wing nose and tail respectively. The fuselage or car 10 is also preferably of metal construction with a view to structural safety throughout the design.

The upper covering or sheeting 30 is shown as struck or otherwise formed into the special shape involved in the present invention, for the purpose of affording an action which may be described as organized directional streamline air flow over the top surface of the wing, directional with the line of flight, for the purpose of securing directional stability, and substantially increasing the effective area of negative pressure or suction, and augmenting the lifting or sustaining effect of the air or wind pressure at the under surface of the wing.

The preferred structure of the upper or negative pressure side of the aerofoil or wing of this invention is well shown in principle in the drawings, and it may be described as embodying a plurality of streamline ridges or fore-and-aft elevations 32 upstanding upon the wing, each having a rounded nose 33 extending substantially to the nose 27 of the wing and a tapered tail 34 extending toward or preferably to the tail edge 28 of the wing; and these ridges are preferably spaced fairly close together so as to produce, between each two of them, a valley or fore-and-aft depression 36, the approach or entrance 37 of which is tapered toward its throat or narrowest point 38, while aft of the throat the valley widens or flares as at 39. Each of the ridges 32 is a streamline shape in the nature of a hump or protuberance projecting at the top or suction side of the aerofoil. Each tapered-flared valley between two ridges is in the nature of an air nozzle, or rather half nozzle, of the Venturi type, tending therefore to deliver rearwardly from the throat a stream of air of accentuated velocity, thus permitting the fore-and-aft dimension, or wing chord, to be substantially increased if desirable, and to a greater extent than practical with usual or previously known wing designs.

Referring further to the preferred construction of aerofoil, the fore-and-aft ridges 32 are shown as modeled throughout to give a universal streamline curvature. Each ridge itself may be considered as a streamline body of best shape for projection through the air. Thus the streamline form is not confined to the curvature along fore-and-aft elements of the surface but prevails at the intersection of substantially any plane with the surface of the ridge. Even a transverse section indicates a lateral curvature of substantially streamline character. When the ridges are spaced closely enough to produce the velocity nozzle 36, these nozzles also are of substantially streamline modeling, conducing to smoothness and effectiveness of flow.

Preferably the peak or apex 35 of each ridge falls approximately in the plane of the main spar 22, which is substantially at the point of maximum section of both the aerofoil and the ridges thereon. Each throat 38 is preferably slightly in advance of the line of apexes 35, the several throats preferably falling in the same transverse plane. As will be observed from Figs. 3 and 4 the ridge span or spacing, from peak to peak, or from center line to center line of the sucessive ridges, preferably decreases toward the tip of the wing. In other words the dimensions and spacing of the sucessive ridges and valleys are progressively smaller toward the wing tips, and this conforms with the illustrated plan form of the wing as seen in Fig. 4, which narrows toward the tip.

The several ridge peaks 35 are shown in Fig. 3 as alined in a substantially straight line, that is until the last few ridges, where the peaks are of successively decreasing height, the final ridge being modeled off smoothly into the plain upper surface 41 of the tip of the wing, this tip surface itself curving downwardly to the extreme lateral edge 31 of the wing tip. Or the under part of the wing may be given a sufficient dihedral angle to cause the ridge apexes of Fig. 3 to be alined in a substantially straight line.

The purpose of the alternate high and low fore-and-aft ribs or frames 24 and 25 will now be understood. Each of the low ribs 24 is located directly under the center line of a valley 36, while each of the high ribs 25 is directly under and gives support to the peak and center portion of each ridge. This skeleton bracing structure of high and low ribs, attached to the main and rear spars, and with shaped sheet metal covering, affords a very rigid, strong and durable aerofoil or wing. The streamline ridge system of the present invention need not be considered as consisting of upstanding additions to a normal wing surface. The surface may be so designed that the valleys project below and the ridges stand up above the normal or average contour of any given wing surface. In other words the aerofoil of this invention may be designed with high lift qualifications with a total volume somewhat less than that of the basic or normal aerofoil or wing, so that the drag or resistance may be actually reduced in this way, with streamlining of the ridge surfaces, augmenting lift or suction.

As already stated the ridged upper wing surface assists to improve the directional stability of the aeroplane. The action is that of a channeled surface traveling through the medium, and the several ridges afford a keel effect, so that upon any accidental swerving of the aeroplane from its direction the action will be to expedite a return to the normal course. At the same time this structure tends to minimize side slip and yawing of the craft. The inverted keel action of a ridge or ridges, streamlined fore-and-aft, on the upper wing surface, is of great advantage in attaining directional stability of aircraft, besides presenting more suction surface and lift within a given area than the usual plain surfaced aerofoil. In this invention the span of the aerofoil or wing may be kept down to a minimum due to providing a concentrated suction or negative pressure area within the limited space by reason of the streamline ridged upper surface of the aerofoil. Or, the aerofoil of this invention will enable a given excessive load to be carried by a monoplane where, with other forms of aerofoil, it might be necessary to resort to a multiplane design to carry the load due to the prohibitive length of wing span otherwise necessary to carry such load.

Referring further to the main purpose and advantage of the present invention, namely to afford a maximum suction or lift at the suction or upper side of the aerofoil, this is brought about by the streamline ridges hereof when considered alone, or when widely spaced and acting alone, but more especially by such ridges when closely enough spaced to produce valleys in the nature of taper-flared nozzles between them. With this invention the sustaining power is substantially enhanced without proportionate increase of drag, and the higher altitudes are more readily attainable, together with increased stability and speed advantages.

In general the action of the streamline ridge system of this invention is materially to increase the effective suction area of the suction or upper side of the aerofoil. The relative rearward air flow deflected upwardly at the nose or front edge of the aerofoil travels above and creates the area of suction, but ordinarily is liable to swing quickly downwardly into positive pressure contact with the upper surface of the aerofoil near the rear or tail edge, thus substantially detracting from the lifting power and producing turbulence over the wing. With the present invention the upwardly deflected air streams are substantially more forcibly projected, and possess such velocity and direction as to preclude or minimize the disadvantageous action just described. In some cases the stream of deflected and traveling air sweeping rearward over the aerofoil may be carried so far astern as not to directly contact again the surface of the aerofoil, thus affording maximum suction lift.

Owing to the universal streamline contours of the several ridges that portion of the relative wind or air which passes above the nose of the aerofoil is deflected not only upwardly in a rearward direction, but upwardly in a side or lateral direction, passing laterally from the valleys over the ridges and upwardly above the surface. In one aspect the incident air may be considered as divided by the successive ridges, and concentrated or compressed in the valley throats, and expanded into high velocity air streams directed upwardly and in both rearward and lateral directions. The ridges are cambered in all directions and the various issuing air streams or sheets are blended, with upward and sidewise motion, to pass effectively over the aerofoil surface, and afford maximum lift. The illustrated construction of aerofoil tends to afford a smooth organized flow and upward and sidewise deflection and delivery of air with high velocity rearward above the wing surface and without substantial turbulence over the surface, so that the suction area and lift are very substantially improved, due to this improved wing form.

The after portions of the several ridges, extending beyond the peak and throat line tend to enhance and prolong the suction effect, due to the progressively decreasing or shrinking cross section and volume of the ridges, while at the same time providing a natural smooth travel for such portions of rarefied air as may be in contact or near contact with the upper surface of the aerofoil.

In one aspect the aerofoil hereof may be considered as a high cambered or deep section one, with the valleys or channels depressed in its top surface. It affords the high lifting effect of the high camber plain surface wing of previous design but with much lowered drag, thus improving the lift-drag ratio. It will require less power or give greater speed than the previously known high cambered aerofoil.

The invention may be broadly described as a wing or other aerofoil for any aircraft having at its suction or upper surface a series of longitudinal or fore-and-aft streamline ridges, or as an aerofoil formed with a system of tapered-flared longitudinal air nozzles or channels. In the aspect of an aeroplane the invention comprises the opposite sustaining wings, each having its upper surface formed with such system of fore-and-aft ridges preferably spaced to produce air channels or valleys between them.

The illustrated relative size and number of stream-line ridges is not intended as a limitation as the number of such ridges and their spacing might be varied with considerable latitude, thus suiting the wave length of Fig. 3 to the action desired. Generally speaking, however, I prefer that the spacing between the center lines of the ridges shall be between four and ten per cent of the wing span at each side, or more specifically that the number of such ridges at each side shall be between ten and twenty-five. It will thus be seen that the ridges and valleys are intended to have substantial size rather than being minute and numerous; and I may specify that the channels are of a depth consonant with the spacing and preferably not less than ten per cent of the total wing depth at any point. Referring to Fig. 5, it will be seen that the maximum section or height of each ridge, and its peak, come substantially at or near the point of maximum section of the aerofoil, and that these are proximate to the line of the throats of the valleys.

Instead of having the leading edge a straight line, seen in plan view, it may be slightly waved or notched, with indentations in front of the valleys and breaking the continuity of the under surface. At slow or stalling speeds and in climbing at steep angles, some air otherwise passing under the wing is enabled to flow through the notch openings and maintain cooperation with the upper or suction surface. Fig. 4ª shows this form; and the rounding surface of and between ridge noses will be understood to be carried also around below the leading edge to an extent, more or less, as indicated in dotted lines at 37ª.

There has thus been described an aircraft embodying an aerofoil in accordance with and attaining the objects of the present invention. Since many matters of operation, arrangement, construction and design may be variously modified without departing from the principles involved, it is not intended to limit the invention to such matters except so far as set forth in the appended claims.

What is claimed is:

1. In an aeroplane and aerofoil or wing having at its suction or upper surface a series of fore-and-aft streamline ridges of progressively smaller dimension toward the wing tip and with an unridged wing tip of substantial area beyond the final ridge.

2. In or for an aircraft a sustaining aerofoil or wing having at its suction or upper surface a closely spaced system of fore-and-aft ridges of substantial width and depth and streamlined both widthwise and depthwise, with rounding front ends near the leading edge of the aerofoil and rear ends tapered toward the trailing edge, and forming between them valleys or air channels of tapered-flared form.

3. In or for an aircraft a sustaining aerofoil or wing having as a part of its suction or upper surface a plurality of parallel fore-and-aft ridges convexly curved in both widthwise and depthwise directions, with convexly rounding air-deflecting front ends near the leading edge of the aerofoil and rear ends of convexly curved section tapered toward the trailing edge, and such ridges spaced to form between them valleys or air channels of tapered-flared form.

4. In or for an aeroplane a sustaining wing having at its upper surface a parallel system of fixed fore-and-aft ridges of substantial width and depth and streamlined both widthwise and depthwise, each with convexly rounded nose near the leading edge of the wing and rear end tapered toward the trailing edge, and so spaced that the sides of the ridges merge into rounding valleys or air channels of tapered-flared form.

5. In or for an aircraft a sustaining aerofoil or wing having at its suction or upper surface a system of fore-and-aft streamlined ridges with convexly rounding noses near the leading edge of the aerofoil and the leading edge notched between such rounding noses.

6. An aerofoil or wing as in claim 3, and wherein the several ridges are arranged with their center lines spaced apart between three and nine percent of the wing span, and each ridge being of depth at least fifteen percent of the total depth.

7. An aerofoil or wing as in claim 3, and wherein the several ridges are arranged with their center lines spaced apart between fifteen and thirty percent of the fore-and-aft dimension of the wing at any point, and the depth of each ridge between twenty-five and fifty percent of such spacing.

8. An aerofoil or wing as in claim 3, and wherein the aerofoil is cambered, with its maximum depth nearer the leading than the trailing edge, and the maximum depth of each ridge at substantially the same point.

9. In or for an aircraft a sustaining wing having at its upper surface across its span a parallel system of fore-and-aft ridges of substantial width and depth and streamlined both widthwise and depthwise, with rounding front ends near the leading edge of the aerofoil and rear ends tapered toward the trailing edge, said ridges being of progressively smaller size and closer spacing toward the wing tip.

10. In or for an aircraft a sustaining wing having at its upper surface across its span a parallel system of fore-and-aft ridges of substantial width and depth and streamlined both widthwise and depthwise, spaced to form tapered-flared valleys between them, and beyond the last ridge an unridged wing tip of substantial area, the extreme end or edge of the wing tip being of rounding contour.

11. In or for an aeroplane a sustaining wing having as a part of its suction or upper surface a plurality of streamlined fore-and-aft ridges with convexly rounding air-deflecting front ends near the leading edge of the aerofoil and rear ends of progressively reducing section extending toward the trailing edge, and such ridges being spaced to form between them a series of air channels having a tapered form between the rounding front ends and therebeyond extending rearwardly toward the trailing edge.

In testimony whereof, this specification has been duly signed by

ROSSITER S. SCOTT.